(12) United States Patent
Zetts

(10) Patent No.: US 6,760,042 B2
(45) Date of Patent: Jul. 6, 2004

(54) SYSTEM AND METHOD OF PROCESSING MPEG STREAMS FOR STORYBOARD AND RIGHTS METADATA INSERTION

(75) Inventor: John Mark Zetts, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 09/850,522

(22) Filed: May 7, 2001

(65) Prior Publication Data

US 2002/0033842 A1 Mar. 21, 2002

Related U.S. Application Data

(60) Provisional application No. 60/232,893, filed on Sep. 15, 2000.

(51) Int. Cl.[7] .................................................. G09G 5/00
(52) U.S. Cl. ....................... 345/716; 345/722; 345/723; 345/726; 386/94
(58) Field of Search ................................ 345/716, 722, 345/721, 720, 723, 726, 730, 731, 732; 715/500, 513, 530; 386/55, 57, 94; 382/232, 239; 375/240.01, 240.29

(56) References Cited

U.S. PATENT DOCUMENTS

| | | | |
|---|---|---|---|
| 5,623,424 A | * | 4/1997 | Azadegan et al. .......... 708/203 |
| 5,649,171 A | * | 7/1997 | Craven et al. ................ 703/23 |
| 5,752,244 A | | 5/1998 | Rose et al. ..................... 707/5 |
| 6,047,374 A | | 4/2000 | Barton ........................ 713/150 |
| 6,219,043 B1 | * | 4/2001 | Yogeshwar et al. ........... 341/55 |
| 6,321,025 B1 | * | 11/2001 | Owashi et al. ................ 386/83 |
| 6,388,680 B1 | * | 5/2002 | Bayrakeri ................... 345/744 |
| 6,573,907 B1 | * | 6/2003 | Madrane ..................... 345/719 |
| 2001/0013123 A1 | * | 8/2001 | Freeman et al. .............. 725/34 |

FOREIGN PATENT DOCUMENTS

WO     WO 99/48296     9/1999 .......... H04N/7/167

* cited by examiner

Primary Examiner—Raymond J. Bayerl
Assistant Examiner—Cuong T. Thai
(74) Attorney, Agent, or Firm—Sandra M. Parker, Esq.

(57) ABSTRACT

A method, apparatus and article of manufacture for storyboard thumbnail and video rights metadata insertion is provided for preventing unauthorized use of restricted video frames of a previously encoded MPEG video file. It can insert video rights metadata in the timecode packet of the affected video frame of the MPEG video file; if requested. To allow automatic recreation of a storyboard file from the MPEG video file, it can insert thumbnail status metadata in the timecode packet of the selected video storyboard thumbnail frame of the MPEG video file. If requested, it can update the video rights metadata in a video catalog record and in the timecode packet of the affected video frame of the MPEG video file. When needed, it can update the thumbnail status metadata in a video catalog record and in the timecode packet of the selected video storyboard thumbnail frame of the MPEG video file.

15 Claims, 13 Drawing Sheets

TIMECODE PACKET

| Block | Offset | Format | Value |
|---|---|---|---|
| 500 — USER DATA START CODE (4 BYTES) | 0 | 0000 0000 | 0X00 |
| | 1 | 0000 0000 | 0X00 |
| | 2 | 0000 0001 | 0X01 |
| | 3 | 1011 0010 | 0XB2 |
| 505 — SIGNATURE (2 BYTES) | 4 | 1010 1010 | 0XAA |
| | 5 | 1010 1GGP | 0XA8 |
| 510 — RELATIVE TIMECODE (3 BYTES) | 6 | BHHH HHMM | |
| | 7 | MMMM SSSS | |
| | 8 | SSXF FFFF | |
| 515 — ABSOLUTE TIMECODE (3 BYTES) | 9 | NHHH HHMM | |
| | 10 | MMMM SSSS | |
| | 11 | XSSF FFFF | |
| 520 — PICTURE PTS (4 BYTES) | 12 | PPPP PPPP | |
| | 13 | PPPP XPPP | |
| | 14 | PPPP PPPP | |
| | 15 | PPPP PPPP | |
| 525 — PICTURE TYPE/REF (1 BYTE) | 16 | PTTR RRRR | |
| 530 — CHECKSUM (1 BYTE) | 17 | CCCC CCCC | |
| 535 — OPTIONAL PADDING (2 BYTES) | 18 | 1111 1111 | |
| | 19 | 1111 1111 | |

RIGHTS FLAGS

00 = FULL RIGHTS
01 = LIMITED RIGHTS
10 = NO RIGHTS
11 = RIGHTS EXPIRED

LEGEND

X = MARKERS
H = HOURS
M = MINUTES
S = SECONDS
F = FRAMES
G = RIGHTS FLAGS

P = PTS
T = PICTURE TYPE
R = PICTURE REFERENCE
C = CHECKSUM
B = THUMBNAIL TAKEN FLAG
N = NO MATCHING HI-RES FLAG

SYSTEM AND METHOD OF PROCESSING MPEG STREAMS FOR STORYBOARD AND RIGHTS METADATA INSERTION

RELATED APPLICATIONS

The present invention is related to a provisional patent application entitled "Apparati and Methods For Processing MPEG Streams" by the same inventor, Ser. No. 60/232,893, filed on Sep. 15, 2000, and co-pending applications entitled: "System and Method of Processing MPEG Streams For File Index Insertion" Ser. No. 09/860,700, filed May 18, 2001, "System and Method of Timecode Repair and Synchronization in MPEG Streams" Ser. No. 09/850,253, filed concurrently, and "System and Method of Processing MPEG Streams For Timecode Packet Insertion" Ser. No. 09/850,201, filed concurrently, all assigned to the assignee of the present invention and fully incorporated herein by reference.

BACKGROUND OF THE INVENTION

1. Field of the Invention

The present invention relates generally to the compression, cataloging and viewing of full motion videos and, more particularly, to the processing of compressed video data.

2. Description of Related Art

The infrastructure and process required to create and operate a video archive in the digital domain are well known in the broadcast video industry. The archiving process generally begins by digitizing and compressing the analog video using MPEG-1 or MPEG-2 compression, then moving the compressed video file to a long term storage. To preserve the contribution quality of the video, broadcasters generally select a high compressed bitrate (i.e., 15–40 Mbps), which allows the original video to be recovered with relatively high fidelity in spite of the lossiness of the MPEG compression scheme.

The high bitrate of the compressed video, however, presents considerable problems to the broadcaster's local area network and computer workstation infrastructure, when the video must be distributed for viewing and post-production work. The high network bandwidth and the amount of time required to transfer the assets throughout the plant places an upper limit on the number of concurrent transfers and severely constrains productivity. In response to this bandwidth problem, broadcasters create an additional copy of the video at a much lower compressed bitrate (i.e., 1.5–4 Mbps). This low bitrate file, referred to as a 'proxy' or 'browse' file, enables users to quickly download the video or to view it directly on computer monitors by utilizing a streaming video server. To facilitate the viewing of video assets outside the local area network, a second proxy file is often encoded at a very low bitrate (56–1000 Kbps), for streaming over low speed terrestrial lines.

After ingestion of the video, the next step in the archiving process is to create an entry for the video in the video library catalog. This entry contains metadata, which is information pertinent to the video. The contents and format of a video catalog record, normally broadcaster unique, facilitate the search and retrieval of video clips within the broadcaster's video library. Presently, there are commercially available video catalog applications (catalogers) that will automatically extract from an MPEG-1 or MPEG-2 video file metadata, such as closed caption text and the text of the actual audio program, obtained via speech recognition technology. Catalogers further extract metadata from the video by performing scene change analysis and creating a bitmap of the first frame after each cut or major scene transition. These bitmaps, referred to individually as a 'thumbnail' or collectively as a storyboard, are considered essential metadata because they enable the end user to determine very quickly the video content. Absent the storyboard, the end user is forced to view the video or, at a minimum, fast forward through a video to find the desired video segment.

Because of subtle scene transitions and video effects, the cataloger does not always capture all desired scene changes. Conversely, at times the scene change detection is too sensitive creating an excessive number of unwanted thumbnails. To remedy this, the MPEG player and metadata viewer applications used in parallel allow an end user to add or delete thumbnails from the storyboard. An 'Add Thumbnail' button on the MPEG player allows a user to select any frame in the video for thumbnail creation.

Should the storyboard metadata be lost due to user error, storyboard file or database corruption, or system failure, the video catalog librarian must re-invoke the cataloger application to recreate the storyboard. This is undesirable from an archive operations perspective because a cataloging workstation is an expensive, limited resource that is dedicated to ingest operations. Worst yet, the lost storyboard may have required considerable manual processing to select the chosen thumbnails. A method for automatically recreating a lost storyboard would considerably enhance cataloging operations.

Managing rights to video content is another very important issue for broadcasters. When broadcasters obtain or ingest material for which they have no rights, the content owner is contacted and full or limited rights to broadcast are obtained through negotiation. Frequently, the broadcaster requests rights to only one or more specific segments of the video clip because the remaining video is low-quality, irrelevant or off-topic. The terms and conditions of the rights agreement are stored as part of the catalog record. In order to ensure the restricted portion of the video is never aired or distributed, an video archive librarian edits the video clip to excise the restricted content.

A disadvantage of this business practice is that the content deleted from the clip may someday become valuable, in which case the broadcaster would then be willing to pay for the right to broadcast it. However, since the desired content is no longer in the video library, it is not searchable and the content owner must be contacted to search for and supply the video. If the broadcaster had a reliable, enforceable method for rights management and content control, program material for which rights have not yet been requested or negotiated could be stored in the video library without fear of inadvertent use. Presently available techniques of maintaining rights status in a catalog record or in a traffic and scheduling database do not provide adequate system control to prevent unauthorized use of restricted content.

Therefore, there is a need for a system and method for inserting storyboard and rights metadata information, for automatic recreation of a lost storyboard, and for an adequate prevention of unauthorized use of restricted video content which is saved in the video library.

SUMMARY OF THE INVENTION

The foregoing and other objects, features, and advantages of the present invention will be apparent from the following detailed description of the preferred embodiments which makes reference to several drawing figures.

One preferred embodiment of the present invention is a method for storyboard thumbnail and video rights metadata insertion, for preventing unauthorized use of restricted video frames of a previously encoded MPEG video file. The method has a step for inserting video rights metadata in the timecode packet of the affected video frame of the MPEG video file; a step for inserting thumbnail status metadata in the timecode packet of the selected video storyboard thumbnail frame of the MPEG video file, allowing automatic recreation of a storyboard file from the MPEG video file; a step for updating the video rights metadata in a video catalog record, and in the timecode packet of the affected video frame of the MPEG video file; and a step for updating the thumbnail status metadata in a video catalog record, and in the timecode packet of the selected video storyboard thumbnail frame of the MPEG video file, thereby preserving the MPEG compliance and compressed audio/video data of the MPEG video file, while maintaining the MPEG video file's original frame presentation timing.

The method creates and uses a custom-built GUI for creating a video rights edit decision list (EDL) of restricted frames, useable during a video file editing session for preventing unauthorized use of restricted video frames, and uses the video rights EDL for inserting or updating the video rights metadata flags of the affected video frame of the MPEG video file. The method locates the timecode packet of the affected video frame of the MPEG video file randomly by binary search, using the video frame's nearest GOP header byte offset obtained through a GOP offset table lookup. The video rights metadata is selected from a group of full rights, limited rights, no rights, or expired rights.

Another preferred embodiment of the present invention is an apparatus implementing the abovementioned method embodiment of the present invention.

Yet another preferred embodiment of the present invention is a program storage device readable by a computer tangibly embodying a program of instructions executable by the computer to perform method steps of the abovementioned method embodiment of the present invention.

BRIEF DESCRIPTION OF THE DRAWINGS

Referring now to the drawings in which like reference numbers represent corresponding parts throughout:

FIG. 5 illustrates a data structure of a compressed MPEG user data packet containing encoded timecode, frame information and metadata, according to the preferred embodiments of the present invention;

DETAILED DESCRIPTION OF THE PREFERRED EMBODIMENTS

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a method and system for processing an MPEG-1 or MPEG-2 video file to insert storyboard and rights metadata information, and to automate the update of an MPEG video when new rights metadata are created or modified.

The preferred embodiments of the present invention mark each frame of an MPEG proxy file that was captured as a storyboard thumbnail, and recreate a storyboard file from the MPEG file by converting each marked frame to a thumbnail bitmap. Moreover, they provide a system and method for defining rights-restricted video segments using the well known feature of the broadcast editing suit for creating video edit decision lists (EDL), to mark each frame of an MPEG file to signal full rights, limited rights, no rights, or expired rights, in order to prevent video producers from incorporating video sections with restricted rights into EDLs, during editing sessions, and to incorporate the rights information into the MPEG high-resolution video file, while saving the restricted video sections in the video file.

Figure 1:
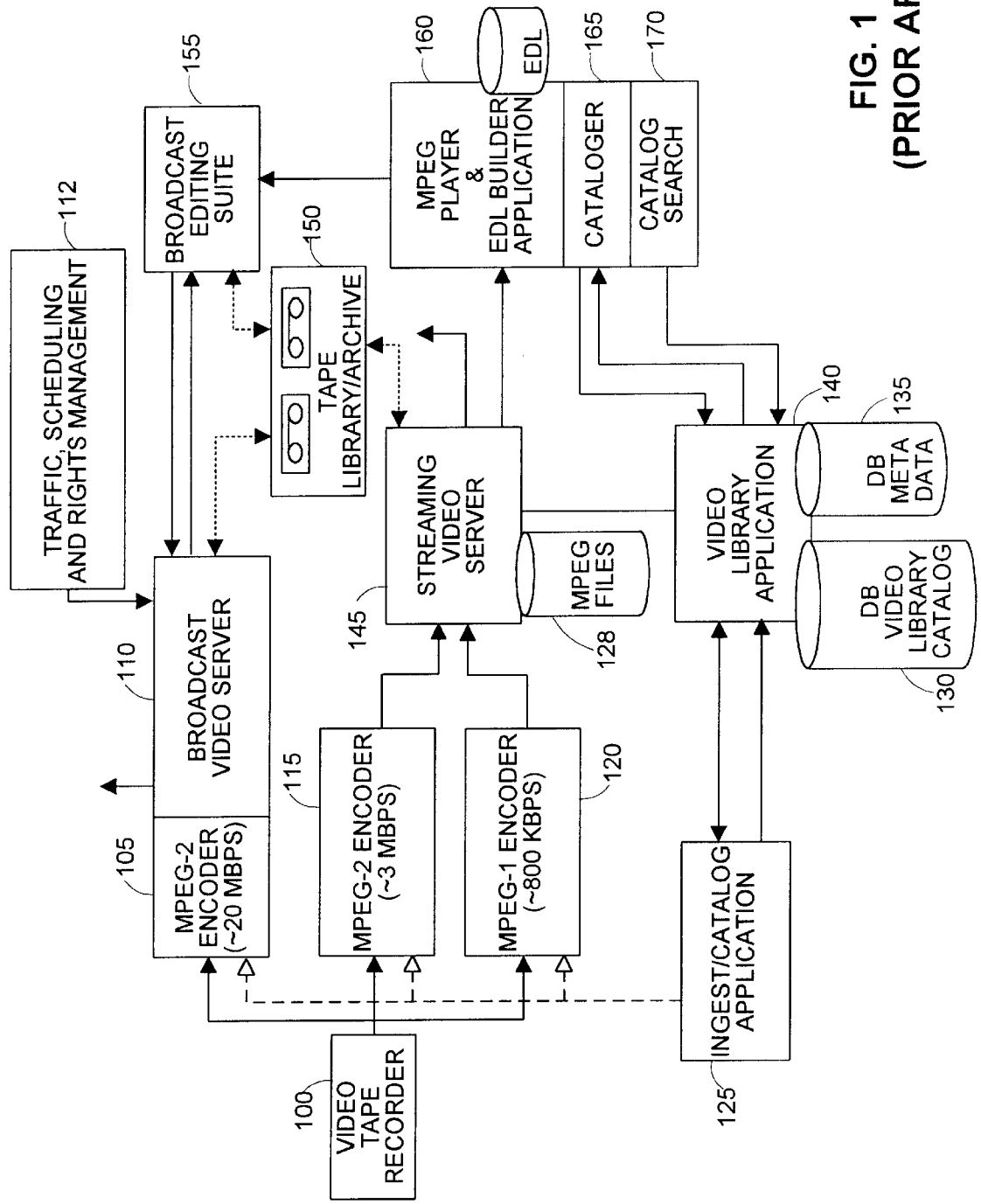
FIG. 1 is an illustration of a conventional video ingest/cataloging system, according to a prior art.

FIG. 1 is an illustration of a conventional video ingest/cataloging system, according to a prior art. In FIG. 1, a video tape recorder 100 provides a source video for encoding. An ingest/catalog application 125 controls three MPEG encoders 105, 115, 120 in parallel, which produce a high-resolution video file and two proxies. The high resolution MPEG encoder 105 is integrated with a broadcast video server 110. As the ingest/catalog application 125 creates MPEG files 128 and associated metadata 135, catalog records in a video library catalog 130 are created or updated using a video library application 140. The cataloging and indexing of the video files enables subsequent search and retrieval.

Upon completion of encoding, the compressed files are moved onto a streaming video server 145 which is capable of file FTP or isochronous streaming to MPEG decoders/players 160. All video content is copied to a tape library/archive 150 for long term storage, and retrieved as necessary. Catalog records are individually examined using a cataloger/metadata viewer 165. The full video or any part thereof may be viewed via the MPEG player 160. Although the right management function may be part of the video library application 140, alternately, a traffic, scheduling and rights system 112 may be integrated into the system to handle rights management, maintain the broadcast schedule and build and export playlists to the broadcast video server 110. The system also incorporates a broadcast editing suite 155 and a catalog search module 170 for handling search requests.

Figure 2:
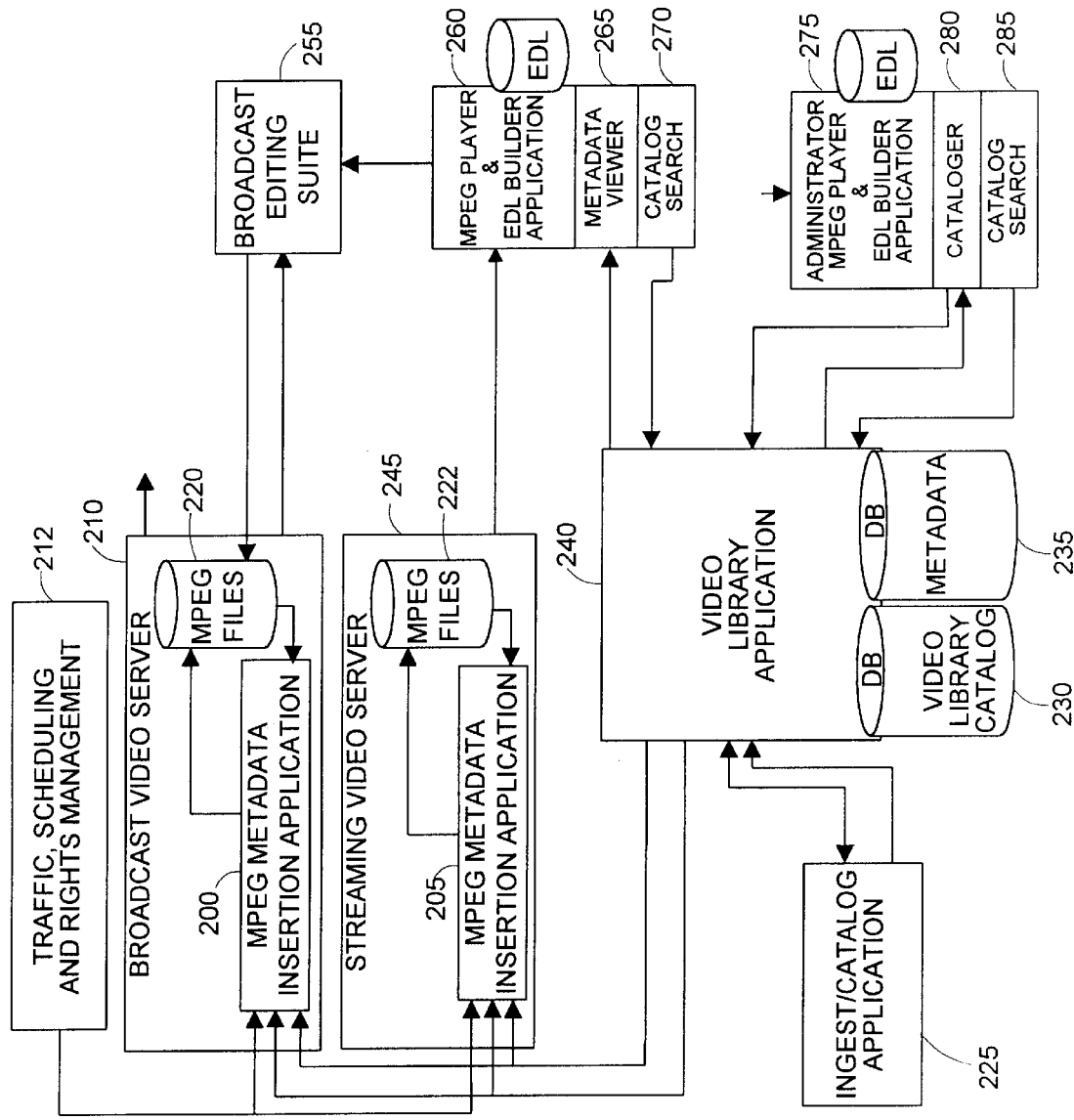
FIG. 2 depicts the placement of the metadata insertion application, executing within the video servers of a video cataloging system, according to a preferred embodiment of the present invention.

In one preferred embodiment of the present invention of FIG. 2 the metadata insertion application software executes as a native program on the respective streaming server where it can operate directly on the MPEG file. In another preferred embodiment of FIG. 3, the metadata insertion application runs on a separate workstation, and the needed MPEG files are accordingly extracted from their respective servers, transferred, updated and replaced. These disadvantageous file transfers are necessitated by video servers that do not support custom applications. The system of FIGS. 2, 3 use the same video tape recorder and three MPEG encoders as the system of FIG. 1, which are therefor not shown.

FIG. 2 illustrates an ingest/cataloging application 225 which receives a catalog record from and updates the metadata in a video library application 240, and which invokes software MPEG metadata insertion applications (MIA) 200, 205 of the present invention, executing natively within their respective video servers: a broadcast video server 210 for playout to air, and a streaming video server 245 for isochronous streaming at 3 Mbps. The video library application 240 passes to each MIA 200, 205 the ID of the video catalog record of the processed MPEG file. Each MIA 200, 205 retrieves the video catalog record from a video library catalog 230 of the video library application 240, to obtain the names of MPEG files and metadata 235. The storyboard file corresponding to the video catalog record is parsed to identify the thumbnail frames by their SMPTE timecodes.

The rights-restricted segments of the video clip, composed as rights EDL statements, are read by each MIA 200, 205 directly from the video catalog record and the affected frames are updated accordingly in MPEG high-resolution video file 220, and in proxy files 222. To avoid the computational expense of performing a sequential read of the MPEG files 220, 222 to locate each timecode data packet, a GOP header byte offset is queried via GOP offset table lookup, as disclosed in co-pending application "SYSTEM AND METHOD OF PROCESSING MPEG STREAMS FOR FILE INDEX INSERTION". This allows the disk read to search randomly, by commencing from the nearest GOP header. During the metadata insertion/update, the video file size is not altered. The extent of the file change is to either set or reset existing flags in the timecode data packet. It should be appreciated that only frames selected as a thumbnail, and frames with restricted rights require updating.

A player cataloger is used to retrieve catalog record and metadata from the video library application 240. An administrator MGEP player and rights EDL builder 275 facilitates the stamping of video segments with rights metadata indicator bits. The library administrator composes a set of rights EDL statements, each of which defines the use permission of a particular segment. When the rights information or storyboard thumbnails metadata are updated using the rights EDL builder 275 or cataloger 280, respectively, the data are stored into the video catalog record, and the MIA 200, 205 is again invoked to process the change. When the library application 240 invokes the MIA 200, 205, both the old and the updated rights metadata EDL statements, or old and new storyboards, are retrieved to facilitate the updating of the MPEG file, minimizing disk I/O. By analyzing the change in storyboard and rights metadata EDL statements, the MIA 200, 205 can determine the SMPTE timecodes from the storyboard thumbnails and rights EDL statements, which also identify the thumbnail frames by their SMPTE timecodes, of the modified video frames for random access, obviating the need to process every frame in the MPEG file. The system also uses a catalog search 285 for sending search requests to the video library application 240.

A broadcast editing suite 255 is used to receive raw MPEG-2 files and program EDL statements to produce air-ready video. A traffic, scheduling and rights management module 212 may also be used. For files isochronously streamed at 3 Mbps, there is an administrator MGEP player and EDL builder 260, which incorporates a metadata viewer 265 and catalog search 270.

Figure 3:
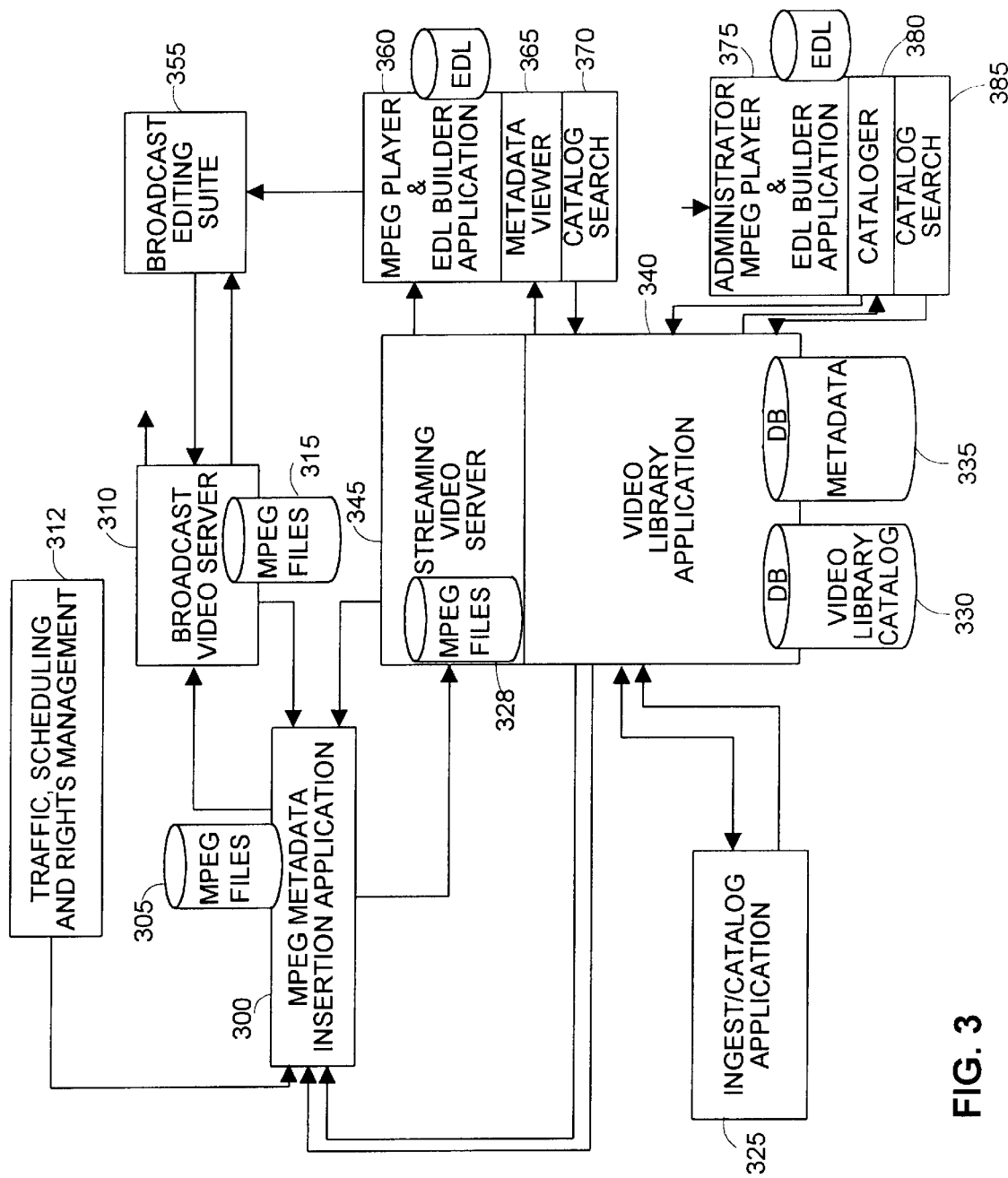
FIG. 3 depicts the placement of the metadata insertion application, executing as a computer software program in a stand-alone workstation of a video cataloging system, according to another preferred embodiment of the present invention.

FIG. 3 illustrates another preferred embodiment of the present invention which integrates a MIA 300 software in a separate workstation, when streaming video servers 310, 345 have neither the bandwidth nor the processor cycles to execute the MIA 300 software without affecting the isochronous streaming of video. As an ingest/cataloging application 325 updates the metadata, a video library application 340 invokes the MIA 300, passing to it the ID of the catalog record. The MIA 300 in turn retrieves MPEG files 315, 328 using an FTP file transfer to move them to a local disk file drive 305. The files are then processed for metadata insertion and replaced in the respective video servers 310, 345, again employing an FTP file transfer. The other components of this embodiment correspond to and act as the described embodiment of FIG. 2.

Since metadata flags must be stored in an MPEG video file on a frame basis, the present invention relies heavily on the technique for inserting timecode packets taught in the co-pending application entitled "APPARATUS AND METHOD OF PROCESSING MPEG STREAMS FOR TIMECODE INSERTION" which inserts timecode packets as user data after the picture header of each frame. Subsequent to the insertion of the timecode packets into the MPEG file, in the preferred embodiments of the present invention the apposite video metadata is stored into the video catalog record corresponding to the video file, and the MPEG video file is reprocessed by storing the metadata information in unused fields of the timecode packets.

Figure 4:
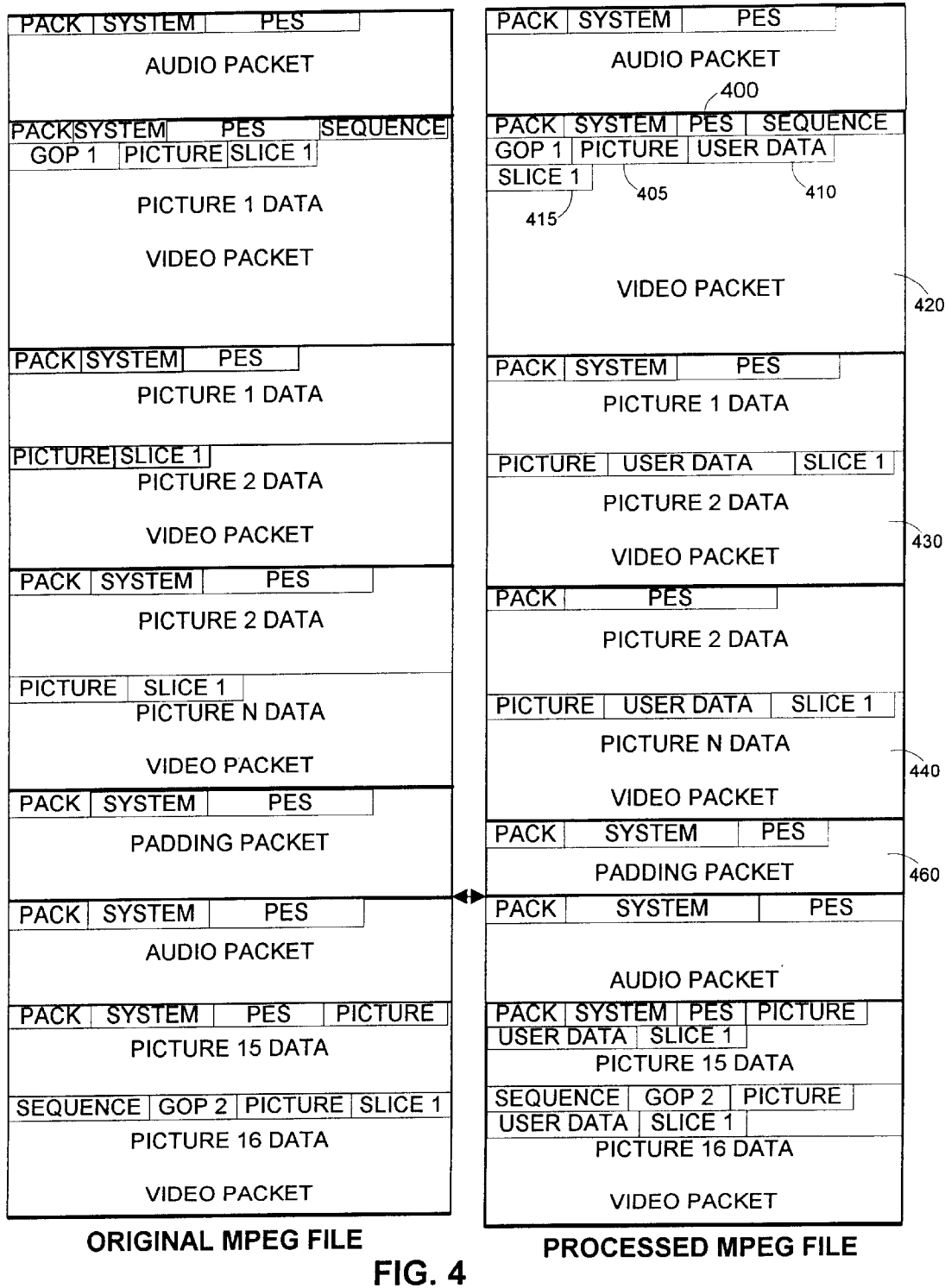
FIG. 4 illustrates the formatting of an MPEG file as originally encoded, and with timecode packets inserted according to the preferred embodiments of the present invention, while maintaining the same bitrate and file length.

FIG. 4 illustrates the formatting of an MPEG file as originally encoded, and with timecode packets inserted according to the preferred embodiments of the present invention, while maintaining the same bitrate and file length. Thus, FIG. 4 provides a high level, non-scaled illustration of the MPEG file format before and after timecode packet insertion, which maintains the original multiplex bitrate and file size. After a PES 400, an 18-byte timecode packet, formatted as a user data packet 410, is placed between a picture header 405 and a first slice 415 of each frame. The timecode packet is also inserted into other video packets, such as video packets-2 430 and video packets-3 440. When a first padding packet 460 is encountered, it is reduced in size to balance out the surplus of timecode bytes.

FIG. 5 illustrates a data structure of a compressed MPEG user data packet containing encoded timecode, frame information and metadata, according to the preferred embodiments of the present invention. In FIG. 5, each timecode packet compressed data structure begins with a standard user data start code 500, followed by a unique 13-bit signature 505 that disambiguates the timecode packet user data from other user data packets that may be present. Three markers, denoted in FIG. 5 by 'X', are placed throughout the remaining data bytes to prevent start code emulation. These markers are also checked by the decoding MPEG player as part of the signature verification. A relative timecode 510 and absolute timecode 515 are encoded in the next 6 bytes, followed by a picture PTS 520, and picture type and reference 525. An 8-bit checksum 530 enables the decoder to detect packet bit errors. There may also be some optional padding 535.

FIG. 5 also illustrates the preferable format and hexadecimal value of each byte of the timecode packet and a legend. A graphical user interface (GUI) is provided to facilitate the identification of rights-restricted video segments. To track video segment rights and thumbnail status on a frame-by-frame basis, the following rights indicator flags, denoted in FIG. 5 by 'G', are defined in rights metadata bits (G) of the timecode data packet signature field 505: thumbnail full rights flag, no rights flag, limited rights flag and rights expired flag. Therefore, the rights metadata become a permanent part of the MPEG video file. Because the set of metadata is generally static, the metadata updates are not likely to result in the frequent update of MPEG files.

When the MPEG proxy file is decoded by the MPEG player during a video editing session, the rights indicator flags are extracted and displayed in both the storyboard and the player display to demarcate rights-restricted video segments. Concurrently, the EDL builder validates each frame of a video clip, defined by the producer selected mark-in and mark-out points, against the rights indicator flags. Clips containing frames with restricted rights are rejected and excluded from the compiled program EDL statements.

To further protect against a producer modifying the program EDL in an effort to bypass the EDL builder's rights enforcement, rights indicator flags are also inserted into the high-resolution MPEG video file, used in the broadcast video server. When the compiled program EDL is executed by the broadcast editing suite against the high-resolution video, it too validates the imported rights EDL against the embedded rights indicator flags and rejects the unauthorized inclusion of unowned or unallowed content.

Inserting/Updating MPEG Video File Storyboard Metadata

Figure 6:
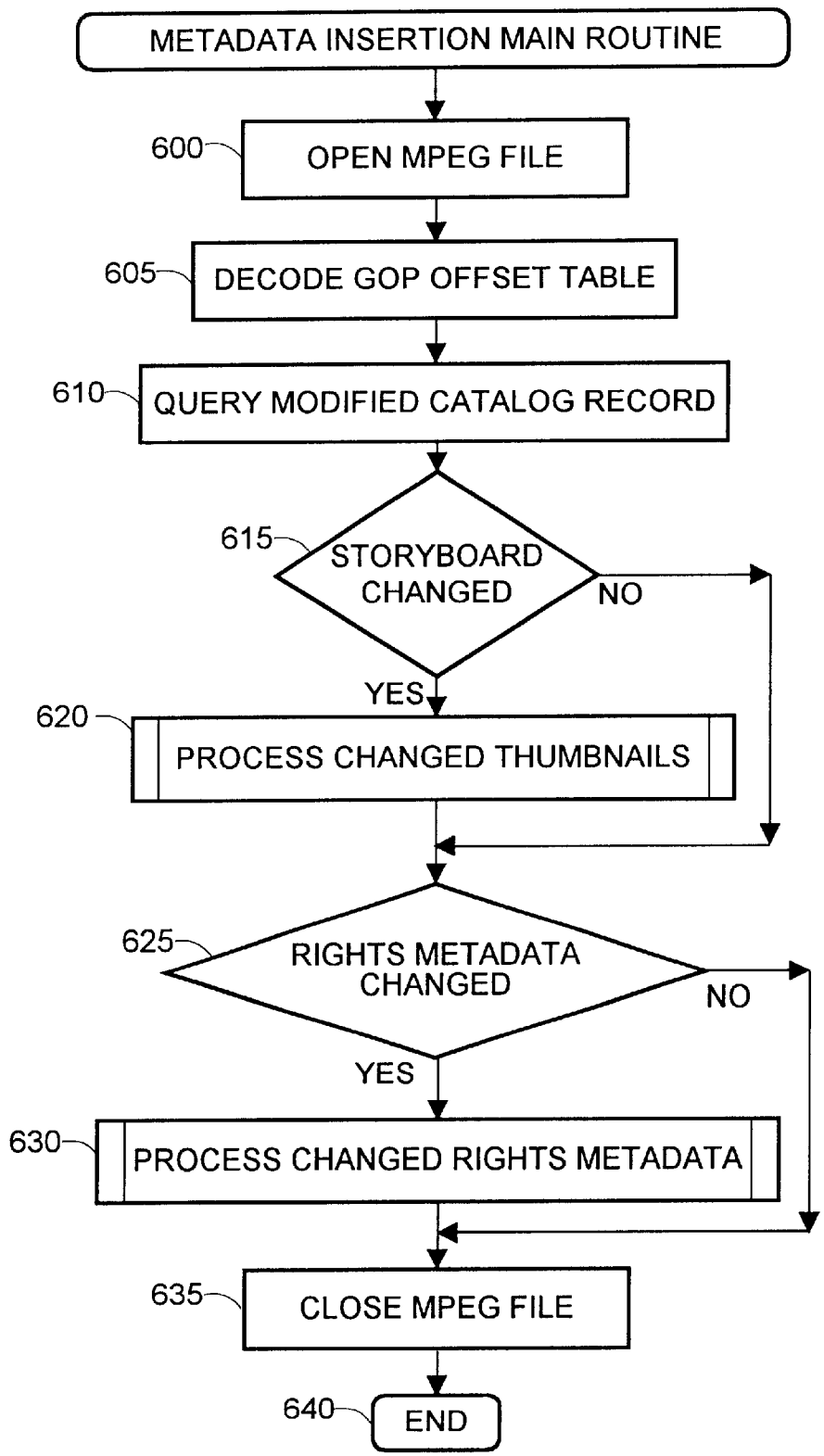
FIG. 6 is a logic flow diagram of the main software routine of the metadata insertion application, according to the preferred embodiments of the present invention.

FIG. 6 is a logic flow diagram of the main software routine of the metadata insertion application, according to the preferred embodiments of the present invention. In FIG. 6, after opening the MPEG file in step 600, in step 605 the application decodes the inceptive padding packets containing the encoded GOP offset table. The modified catalog record is then retrieved in step 610, using the catalog record ID passed at invocation. A test is conducted in step 615 to determine whether the video storyboard has been modified. If yes, the Process Changed Thumbnails routine is called in step 620 to update the MPEG file accordingly. If not, in step 625 it will be checked whether the rights metadata have been modified, as described later.

Figure 7:
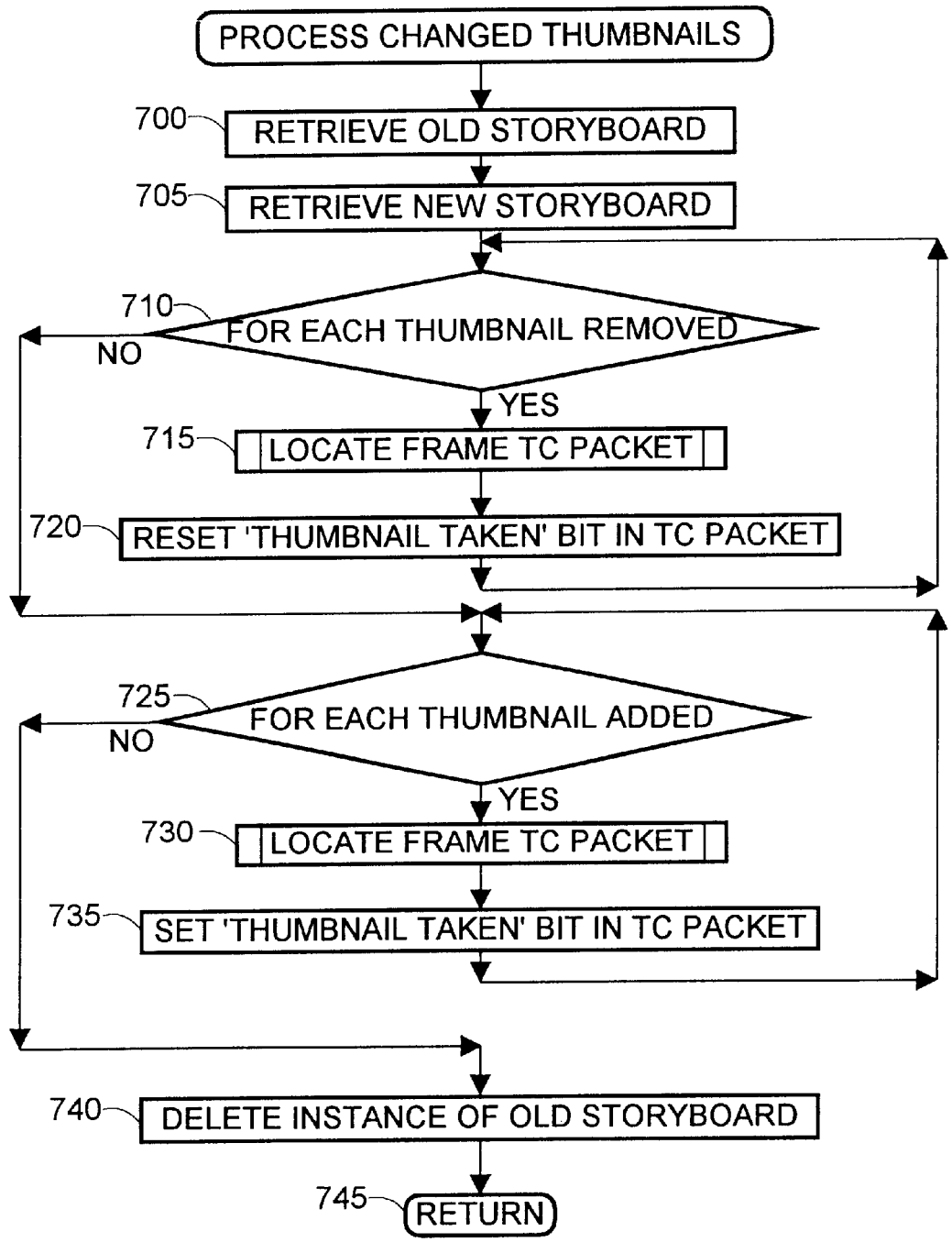
FIG. 7 is a logic flow diagram of a software routine for storing storyboard metadata into an MPEG video file, according to the preferred embodiments of the present invention.

FIG. 7 is a logic flow diagram of a software routine for storing modified storyboard metadata into an MPEG video file, according to the preferred embodiments of the present invention. Referencing FIG. 7, the application proceeds to retrieve both the old and new storyboard in steps 700, 705, respectively, to perform a comparison. The video library application creates an instance of the old storyboard for each MPEG file requiring an update. The instance is deleted as the MIA completes processing. Continuing, a loop is entered in step 710 to process each thumbnail that was removed in the new storyboard. For each thumbnail deleted, the associated frame timecode packet is located in step 715, and the 'thumbnail taken' bit is reset in step 720. When all removed thumbnails have been identified, the loop exits with a no condition in step 710. A second loop is initiated in step 725 to process each thumbnail that has been added to the storyboard. As each new thumbnail is identified, the timecode packet is located in step 730, and the 'thumbnail taken' bit is set in step 735. When all new thumbnails in the updated storyboard have been handled, the loop exits with a no condition in step 725. Then, the instance of the old storyboard is deleted from the library in step 740, and the routine returns in step 745.

Figure 8:
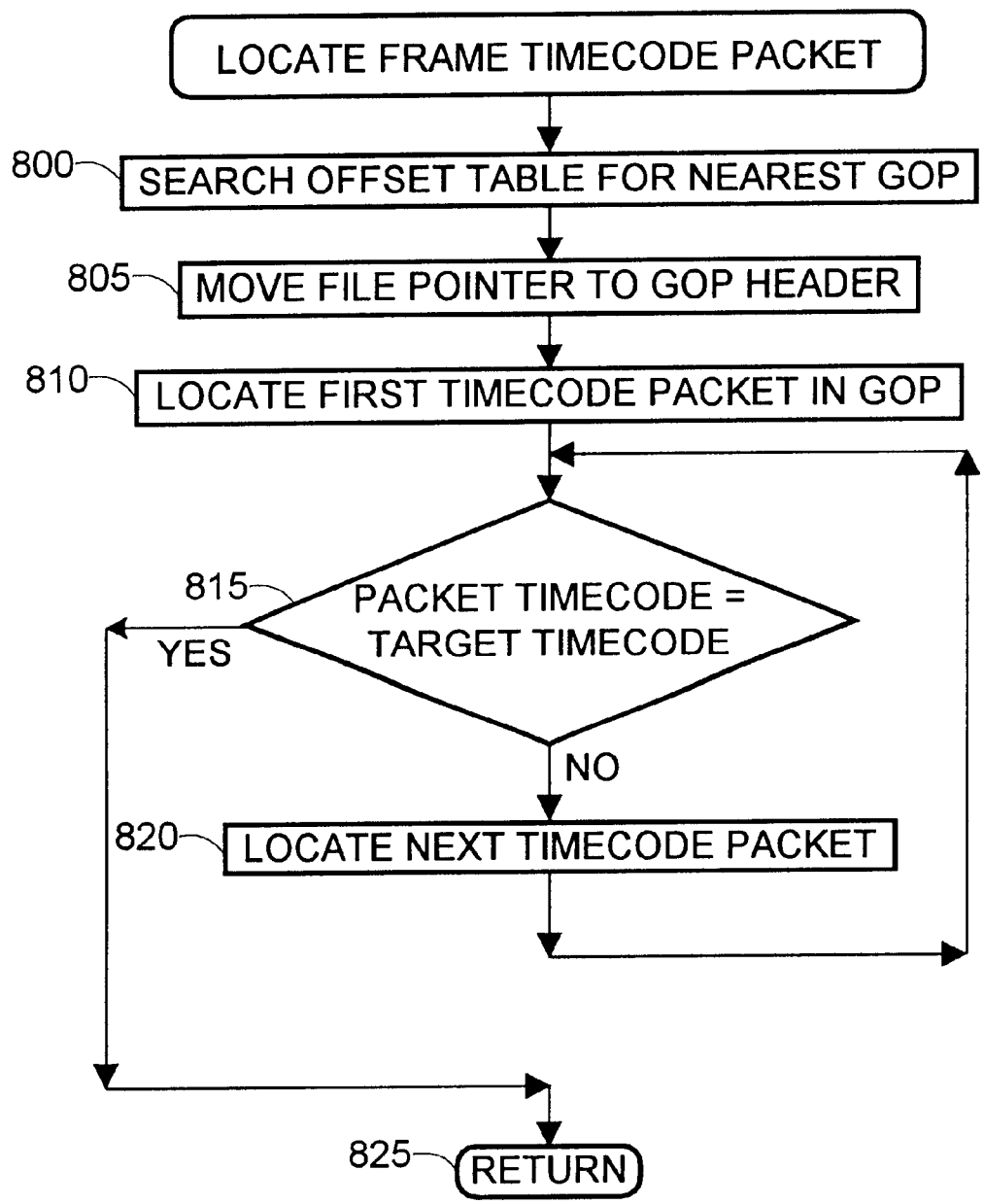
FIG. 8 is a logic flow diagram of a software routine for locating a timecode packet for any given video frame, according to the preferred embodiments of the present invention.

FIG. 8 is a logic flow diagram of a software routine for locating a frame timecode packet for any given video frame, according to the preferred embodiments of the present invention. In FIG. 8, using an efficient binary search for indexing by frame timecode, the nearest GOP header is located in the GOP offset table in step 800. In step 805, the MPEG file pointer is advanced to the GOP header location and in step 810 the timecode packet of the first frame in the GOP is located by serially reading the MPEG file until the associated user data start code is found. The logic then falls into a loop through each frame to locate the timecode packet of the target frame. As long as, in step 815, the timecode of the current frame does not equal the target frame timecode, the loop continues to advance to the next timecode packet in step 820. The loop exits with a yes condition in step 815, when the target timecode packet is found, and the routine returns in step 825.

Inserting/Updating MPEG Video File Rights Metadata

Returning to FIG. 6, the main routine in step 625 tests the catalog record for a change in the rights metadata and calls Process Changed Rights Metadata routine in step 630 to modify the MPEG file accordingly.

Figure 9:
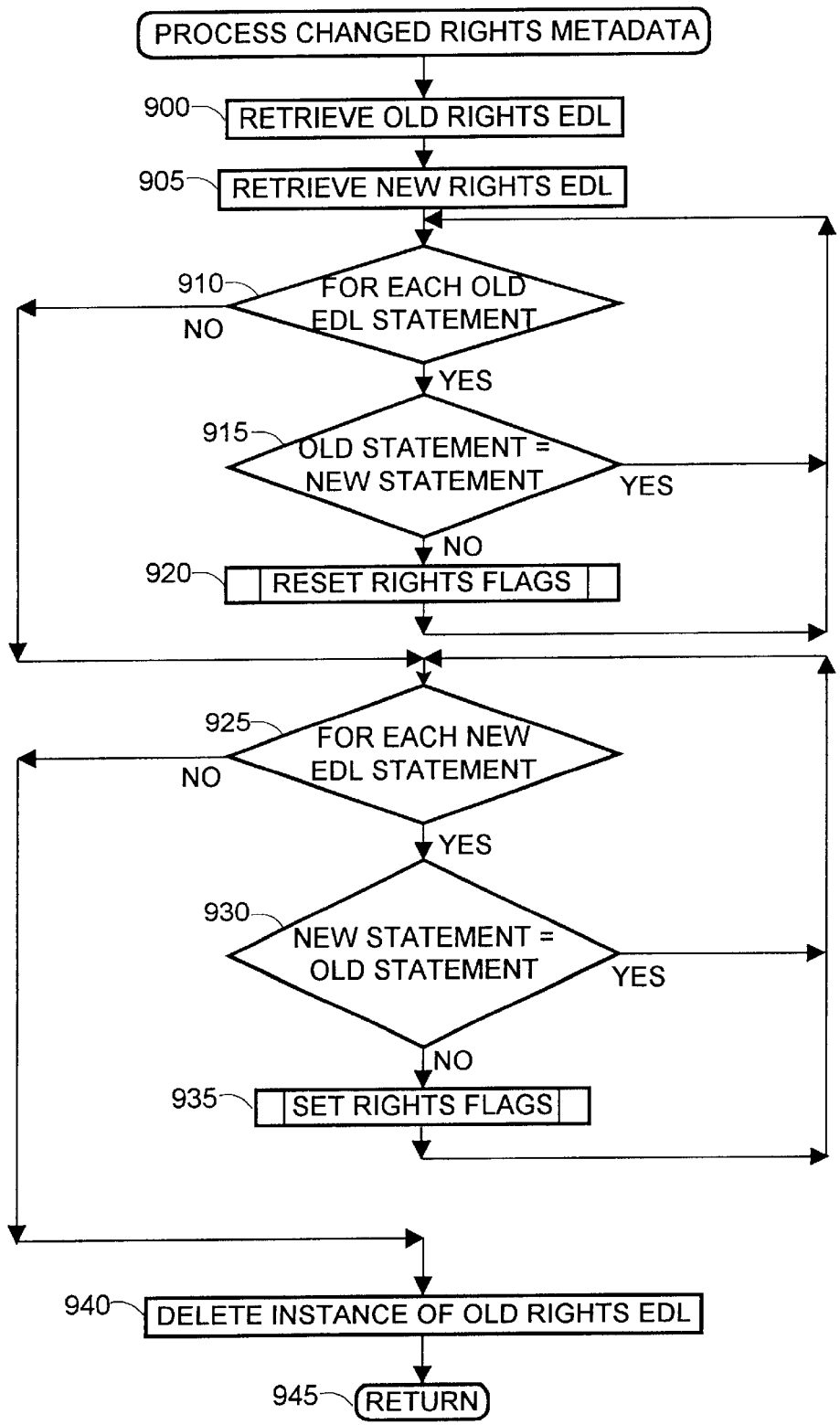
FIG. 9 is a logic flow diagram of a software routine for storing rights associated metadata into an MPEG video file, according to the preferred embodiments of the present invention.

FIG. 9 is a logic flow diagram of a software routine for storing changed rights metadata into an MPEG video file, according to the preferred embodiments of the present invention. The process of updating the MPEG file with rights metadata, illustrated in FIG. 9, commences with the retrieval of the old and new rights EDL, in steps 900, 905, respectively, for instances created by the video library application prior to MIA invocation. The comparison of the old and new rights EDL is performed in two logic loops, designed to limit the accessing of the MPEG file to only those video frames with changed rights metadata. The first loop, starting in step 910, in step 915 compares the old EDL statements to the new statements, to determine if the statement is unchanged in the updated EDL. If in step 915 it is determined that the EDL is unchanged, the yes condition, the loop iterates to handle the next EDL statement.

Otherwise, the old EDL statement has been either modified or deleted and the Reset Rights Flags routine is called in step 920 to reset the rights indicator bits in the timecode packet to zero, which equates to full rights, the default setting. After iterating through each of the old EDL statements, the loop exits in step 910 on the no condition, and a second loop is started to process the new EDL statements in step 925. In a fashion similar to the first logic loop, each new EDL statement is compared to the old EDL statements in step 930, and if the new statement cannot be found, the appropriate rights bits are set in the timecode packet, in step 935. When the new EDL statements have been exhausted, the loop exits with the no condition in step 925, and the instance of the old rights EDL is deleted in step 940. The routine then returns in step 945 to the main routine.

Figure 10A:
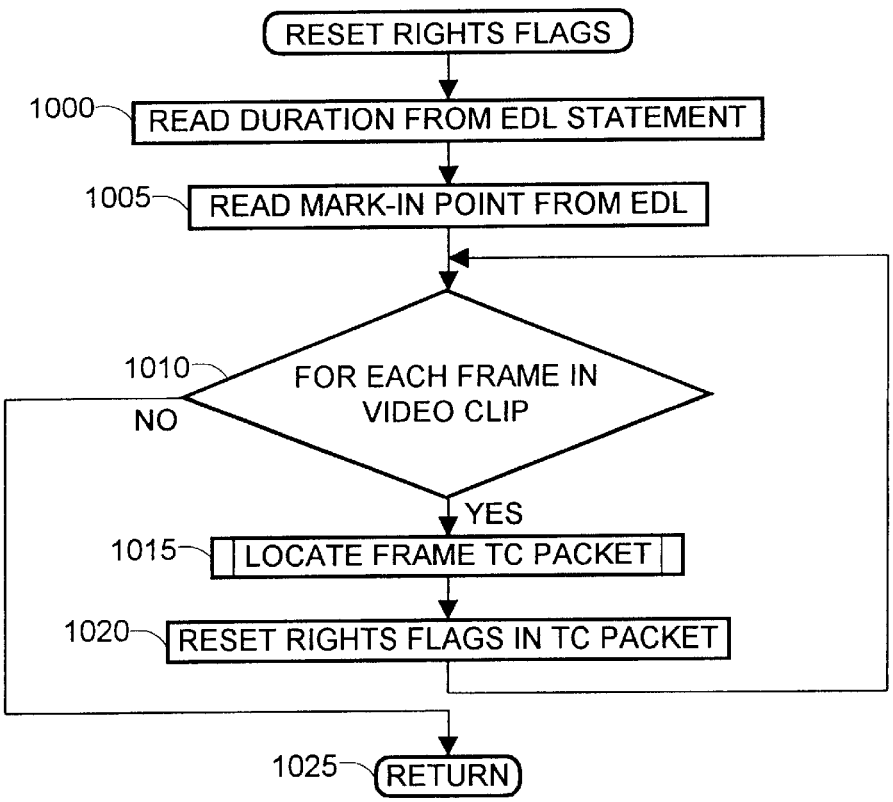
FIG. 10A illustrates the logic flow of a software routine for resetting the rights indicator bits in the timecode packet, according to the preferred embodiments of the present invention.

FIG. 10A illustrates the logic flow of a software routine for resetting the rights indicator flag bits in the timecode packet, according to the preferred embodiments of the present invention. FIG. 10A thus renders the logic flow of the Reset Rights Flags routine. In step 1000 the duration of the video clip is read from the EDL statement. In step 1005 the mark-in frame of the video clip is read from the EDL statement. In step 1010, for each frame of the clip the timecode packet is located in step 1015, and the two rights indicator bits are reset in the timecode packet, in step 1020. All of the frames of the clip are contiguous and the loop processes each frame serially, until the mark-out timecode is reached, at which point the loop exits with a no condition in step 1010, and the module returns in step 1025.

Figure 10B:
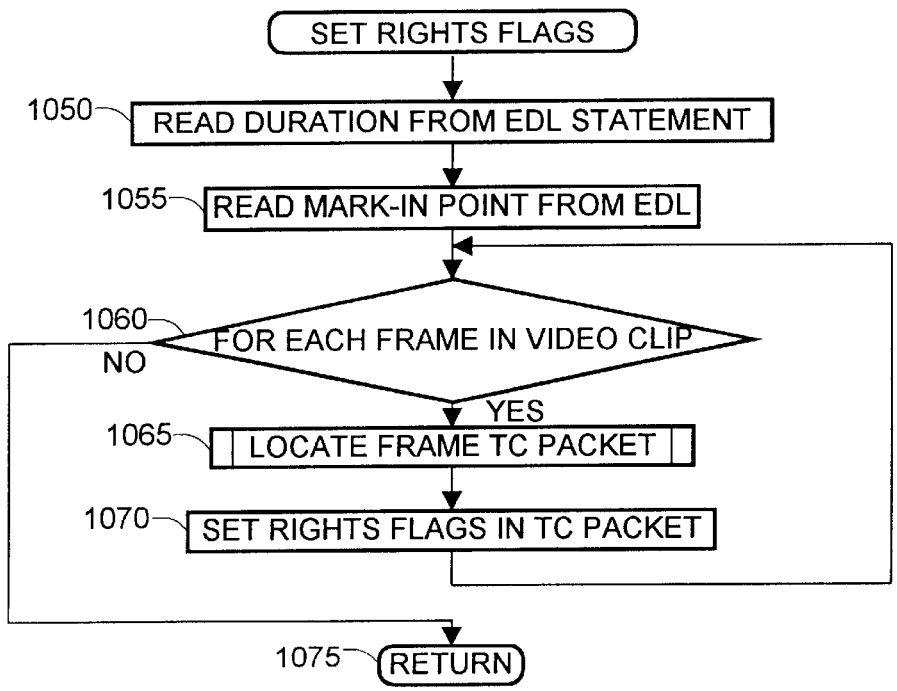
FIG. 10B illustrates the logic flow of a software routine for setting the rights indicator bits in the timecode packet, according to the preferred embodiments of the present invention.

FIG. 10B illustrates the logic flow of a software routine for setting the rights indicator flag bits in the timecode packet, according to the preferred embodiments of the present invention. Set Rights Flags module of FIG. 10B is nearly identical to the Reset Rights Flags routine of FIG. 10A, with the exception that the rights indicator bits are set in step 1070 according to the rights permission metadata, contained in the EDL statement. Thus, in step 1050 the duration of the video clip is read from the EDL statement. In step 1055 the mark-in frame of the video clip is read from the EDL statement. In step 1060, for each frame of the clip the timecode packet is located in step 1065, and the two rights indicator bits are set in the timecode packet in step 1070. All of the frames of the clip are contiguous and the loop processes each frame serially, until the mark-out timecode is reached, at which point the loop exits with a no condition in step 1060, and the module returns in step 1075.

Referring back to FIG. 6, with the update of the MPEG files completed, the main routine closes the MPEG file in step 635 and ends execution of the MIA application in step 640.

Extracting Metadata During MPEG Decoding

Figure 11:
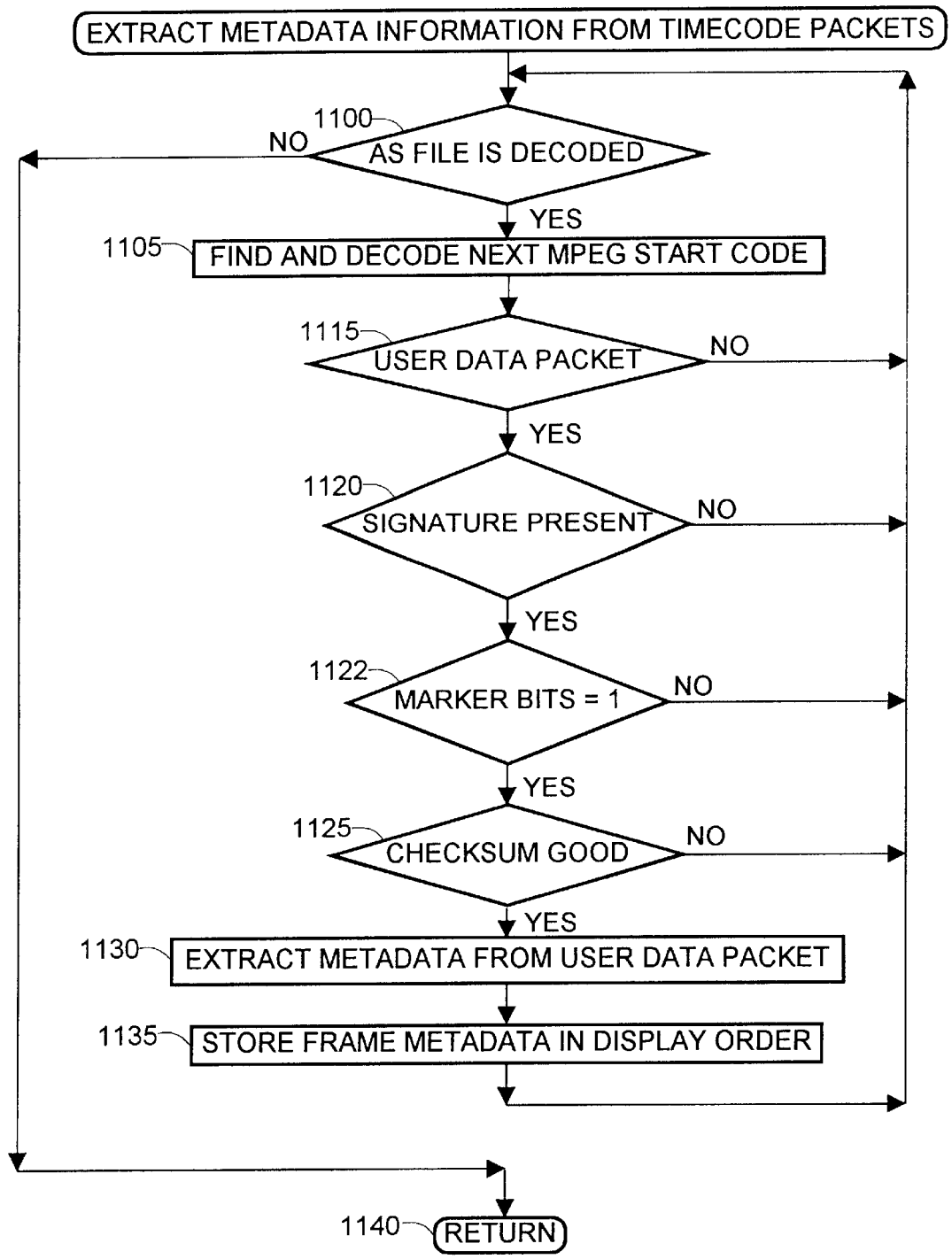
FIG. 11 is a logic flow of a software routine used by the MPEG decoder for extracting metadata from the timecode packet, according to the preferred embodiments of the present invention.

FIG. 11 is a logic flow of a software routine used by the MPEG decoder for extracting metadata information from the timecode packets, according to the preferred embodiments of the present invention. In FIG. 11, as the MPEG file is decoded by the MPEG player in step 1100, each MPEG start code is detected in step 1105. In step 1115, the user data packets are detected for further processing. In step 1120, the user data packet is tested for the timecode signature. As a further precaution, the packet marker bits are tested for the set condition in step 1122. If both tests are satisfied, the yes condition, and the checksum is validated in step 1125, the 'thumbnail taken' and the rights indicator bits for this frame are extracted in step 1130, and stored in display order in step 1135. The rights metadata are referenced by the EDL builder and the cataloger applications via API invocation, to call the video library application. At the end of the file, the routine returns in step 1140.

Video Library Administrator's MPEG Player/Cataloger/EDL Builder

Figure 12:
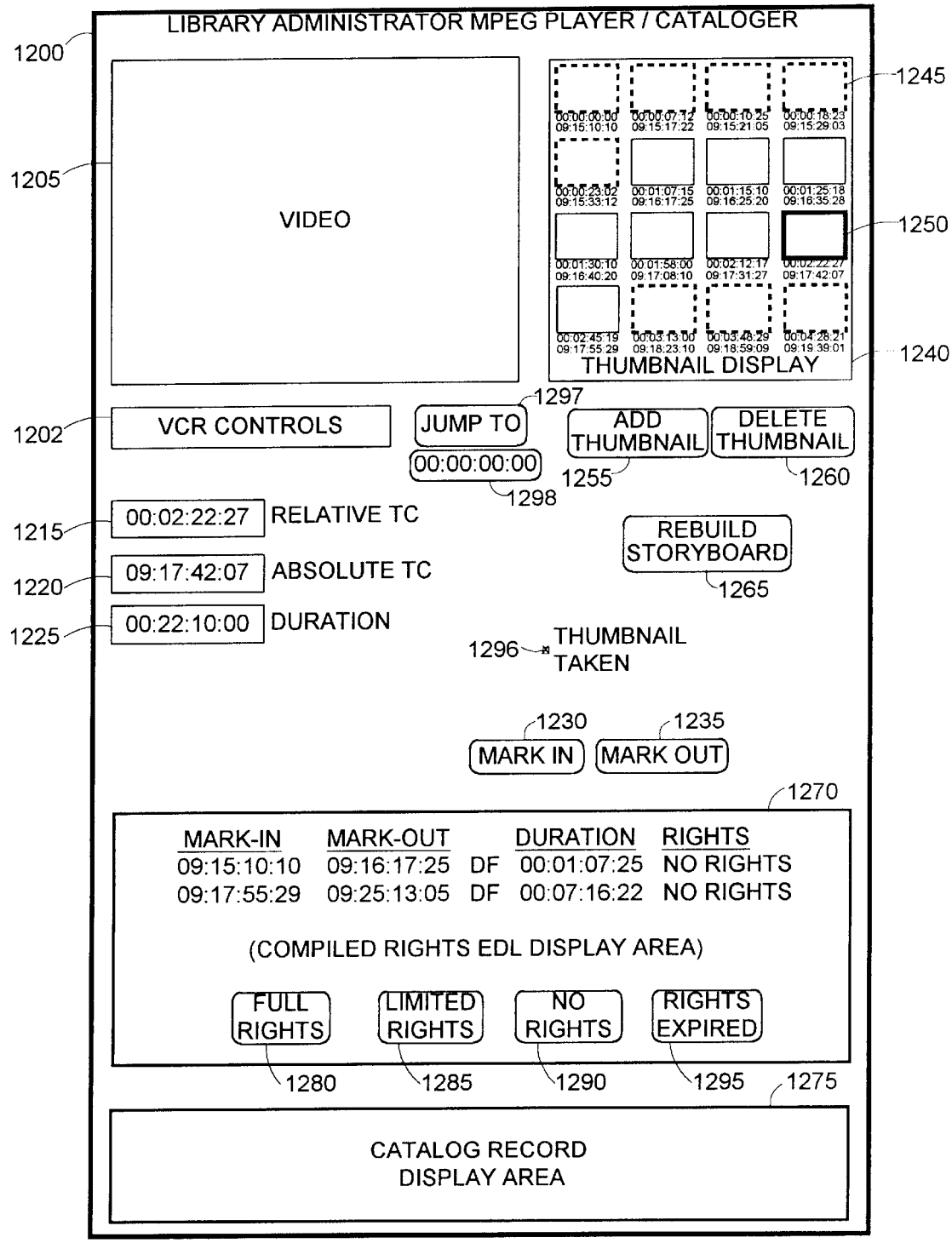
FIG. 12 is an illustration of the graphical user interface (GUI) of an MPEG player, cataloger and EDL builder used for library administration, according to the preferred embodiments of the present invention.

FIG. 12 is an illustration of the graphical user interface (GUI) of an MPEG player, cataloger and rights EDL builder 1200 used for video library administration, according to the preferred embodiments of the present invention. In the layout of the librarian's MPEG player, cataloger and rights EDL builder of FIG. 12, VCR controls 1202 are provided, and a video display area 1205 reflects a paused video with a current position of 00:02:22:27. The lower portion of the window provides a display area for the catalog record 1275, and a rights EDL statements display 1270, for data that have been thus far compiled. A relative timecode 1215, absolute timecode 1220, and duration 1225 of the current frame are displayed. These timecodes are captured by the application in response to the end user clicking a mark-in 1230 and mark-out 1235 buttons, to define the starting and ending frames of a video clip.

In a storyboard display window 1240, the first five thumbnails are marked with a heavy dashed border 1245 indicating that they are rights-restricted frames. The twelfth thumbnail 1250 is highlighted to show that it was clicked upon to cue the video playing to that frame. A thumbnail indicator 1296 reveals that the frame was captured as a thumbnail. Thumbnails may be deleted from or added to the storyboard by clicking on appropriate buttons 1260, 1255, respectively. The storyboard can also be rebuilt from the MPEG file by clicking on a rebuild storyboard button 1265. There is also a jump-to button 1297, to select a timecode 1298 for a desired video clip to be jumped to.

To set the rights metadata for various segments of the video, the library administrator builds rights EDL statements for each restricted segment using the mark-in 1230 and mark-out 1235 buttons. After defining the video clip, the rights are set by clicking on one of rights selection buttons: fill rights 1280, limited rights 1285, no rights 1290, and rights expired 1295. Upon completion of cataloging, the updated storyboard and rights EDL are loaded into the catalog record, which triggers the invocation of the MIA.

Video Producer's MPEG Player/Metadata Viewer/EDL Builder

Figure 13:
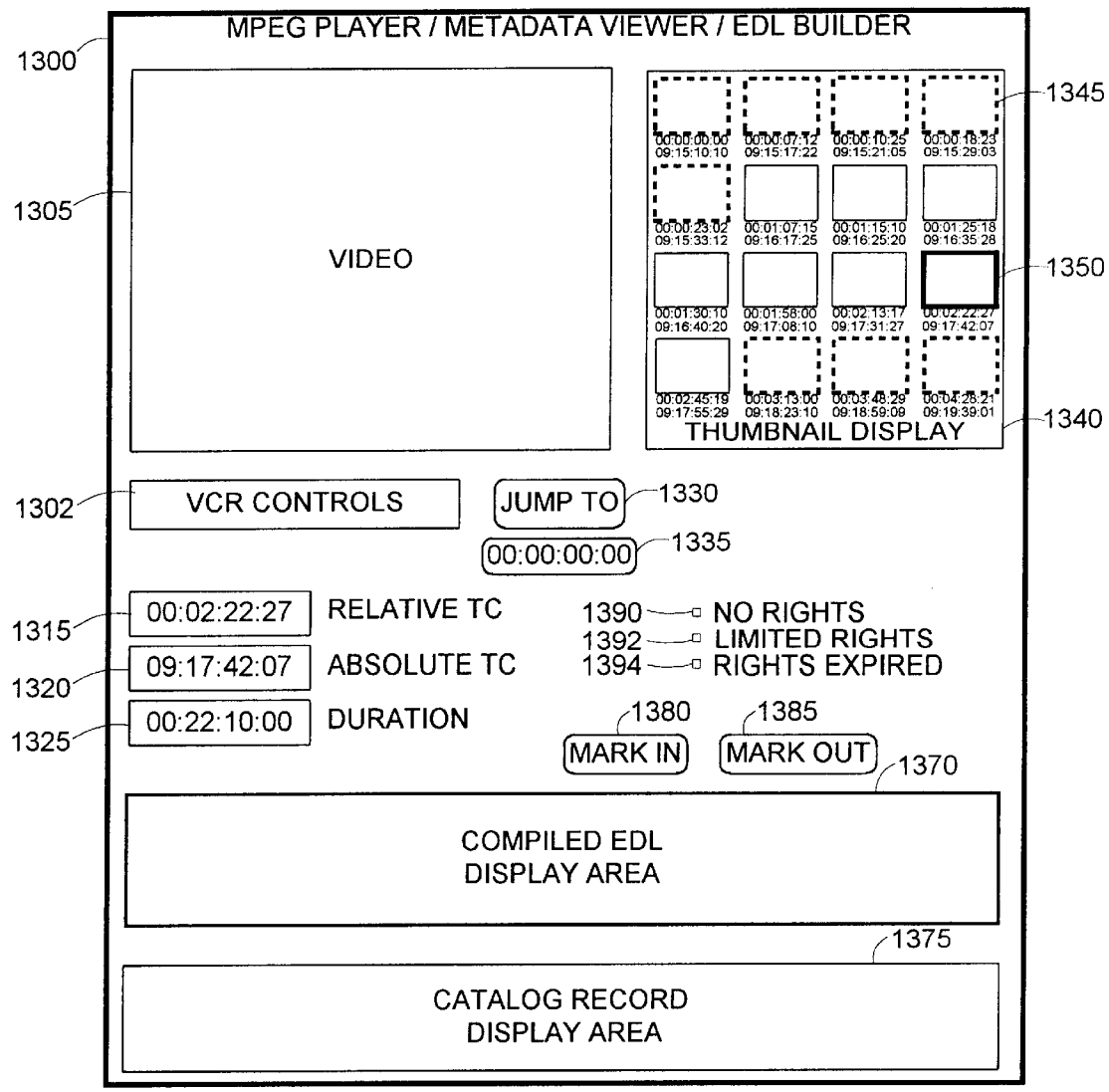
FIG. 13 is an illustration of the graphical user interface of an MPEG player, metadata viewer and EDL builder used by a video production specialist, according to the preferred embodiments of the present invention.

FIG. 13 is an illustration of the graphical user interface of an MPEG player, metadata viewer and EDL builder 1300, used by a video production specialist, according to the preferred embodiments of the present invention. In the layout of the video producer's MPEG player, metadata viewer and EDL builder of FIG. 13, VCR controls 1302 are provided, and a video display area 1305 reflects a paused video with a current position of 00:02:22:27. The lower portion of the window provides a display area for the catalog record 1375, and a program EDL display 1370, for data that have been thus far compiled. A relative timecode 1315, absolute timecode 1320, and duration 1325 of the current frame are displayed. These timecodes are captured by the application in response to the end user clicking a mark-in 1380 and mark-out 1385 buttons, to define the starting and ending frames of a video clip. There is also a jump-to button 1330, to select a timecode 1335 for a desired video clip to be jumped to.

In a storyboard display window 1340, the first five thumbnails are marked with a heavy dashed border 1345 indicating that they are rights-restricted frames. The twelfth thumbnail 1350 is highlighted to show that it was clicked upon to cue the video playing to that frame. Rights permission flag indicators display rights of each frame and include: no rights indicator 1390, limited rights indicator 1392, and expired rights indicator 1394. During the video editing session, the EDL builder suppresses the generation of any program EDL statement defining a video clip that contains any frame with restricted rights.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for storyboard thumbnail and video rights metadata insertion, for preventing unauthorized use of restricted video-frames of a previously encoded MPEG video file, wherein each video frame header of the MPEG video file including a compressed timecode packet having an identifying signature, an absolute and a relative SMPTE timecode of the frame, and a picture type and reference, the method comprising the following steps:

(a) if an incorporation of video rights metadata of an MPEG video file frame requested, inserting video rights metadata flags in predetermined fields of the timecode packet of the affected video frame of the MPEG video file;

(b) if an incorporation of thumbnail status metadata requested for a selected video storyboard thumbnail, inserting thumbnail status metadata flags in predetermined fields of the timecode packet of the selected video storyboard thumbnail frame of the MPEG video file, allowing automatic recreation of a storyboard file from the MPEG video file;

(c) if a modification of a selected video rights metadata requested, updating accordingly the video rights metadata in a video catalog record corresponding to the MPEG video file, and updating accordingly the video rights metadata flags in the predetermined fields of the timecode packet of the affected video frame of the MPEG video file; and (d) if a modification of a selected video storyboard thumbnail status metadata requested, updating accordingly the thumbnail status metadata in a video catalog record corresponding to the MPEG video file, and updating accordingly the thumbnail status metadata flags in the predetermined fields of the timecode packet of the selected video storyboard thumbnail frame of the MPEG video file, thereby preserving the MPEG compliance and compressed audio/video data of the MPEG video file, while maintaining the MPEG video file's original frame presentation timing.

2. The method according to claim 1, wherein the steps (a) and (c) further comprising the following steps:

using a custom-built GUI for creating a video rights edit decision list (EDL) of restricted frames, useable during a video file editing session for preventing unauthorized use of restricted video frames; and using the video rights EDL for inserting or updating the video rights metadata flags of the affected video frame of the MPEG video file.

3. The method according to claim 1, wherein the updating steps (c) and (d) further comprising the step of locating the timecode packet of the affected video frame of the MPEG video file randomly by binary search, using the video frame's nearest GOP header byte offset obtained through a GOP offset table lookup.

4. The method according to claim 1, wherein the video rights metadata being selected from a group comprising full rights, limited rights, no rights, or expired rights.

5. The method according to claim 1, wherein the timecode packet being inserted in a user data packet of the video frame, between a picture start header and a first slice header.

6. A system for storyboard thumbnail and video rights metadata insertion, for preventing unauthorized use of restricted video frames of a previously encoded MPEG video file, wherein each video frame header of the MPEG video file including a compressed timecode packet having an identifying signature, an absolute and a relative SMPTE timecode of the frame, and a picture type and reference, comprising:

a computer coupled to an electronic storage device for storing the MPEG video file;

programming means, performed by the computer, for inserting video rights metadata flags in predetermined fields of the timecode packet of the affected video frame of the MPEG video file;

programming means, performed by the computer, for inserting thumbnail status metadata flags in predetermined fields of the timecode packet of the selected video storyboard thumbnail frame of the MPEG video file, allowing automatic recreation of a storyboard file from the MPEG video file;

programming means, performed by the computer, for updating accordingly the video rights metadata in a video catalog record corresponding to the MPEG video file, and updating accordingly the video rights metadata flags in the predetermined fields of the timecode packet of the affected video frame of the MPEG video file; and programming means, performed by the computer, for updating accordingly the thumbnail status metadata in a video catalog record corresponding to the MPEG video file, and updating accordingly the thumbnail status metadata flags in the predetermined fields of the timecode packet of the selected video storyboard thumbnail frame of the MPEG video file, thereby preserving the MPEG compliance and compressed audio/video data of the MPEG video file, while maintaining the MPEG video file's original frame presentation timing.

7. The system according to claim 6, further comprising a custom-built GUI means, useable for creating a video rights edit decision list (EDL) of restricted frames, wherein the rights EDL means being useable during a video file editing session for preventing unauthorized use of restricted video frames, and for inserting or updating the video rights metadata flags of the affected video frame of the MPEG video file.

8. The system according to claim 6, further comprising means for locating the timecode packet of the affected video frame of the MPEG video file randomly by binary search, using the video frame's nearest GOP header byte offset obtained through a GOP offset table lookup.

9. The system according to claim 6, wherein the video rights metadata being selected from a group comprising full rights, limited rights, no rights, or expired rights.

10. The system according to claim 6, wherein the timecode packet being located in a user data packet of the video frame, between a picture start header and a first slice header.

11. A program storage device readable by a computer tangibly embodying a program of instructions executable by the computer to perform method steps for storyboard thumbnail and video rights metadata insertion, for preventing unauthorized use of restricted video frames of a previously encoded MPEG video file, wherein each video frame header of the MPEG video file including a compressed timecode packet having an identifying signature, an absolute and a relative SMPTE timecode of the frame, and a picture type and reference, and the MPEG video file stored in an electronic storage device coupled to the computer, the method comprising the following steps:

(a) if an incorporation of video rights metadata of an MPEG video file frame requested, inserting video rights metadata flags in predetermined fields of the timecode packet of the affected video frame of the MPEG video file;

(b) if an incorporation of thumbnail status metadata requested for a selected video storyboard thumbnail, inserting thumbnail status metadata flags in predetermined fields of the timecode packet of the selected video storyboard thumbnail frame of the MPEG video file, allowing automatic recreation of a storyboard file from the MPEG video file;

(c) if a modification of a selected video rights metadata requested, updating accordingly the video rights metadata in a video catalog record corresponding to the MPEG video file, and updating accordingly the video rights metadata flags in the predetermined fields of the timecode packet of the affected video frame of the MPEG video file; and (d) if a modification of a selected video storyboard thumbnail status metadata requested, updating accordingly the thumbnail status metadata in a video catalog record corresponding to the MPEG video file, and updating accordingly the thumbnail status metadata flags in the predetermined fields of the timecode packet of the selected video storyboard thumbnail frame of the MPEG video file, thereby preserving the MPEG compliance and compressed audio/video data of the MPEG video file, while maintaining the MPEG video file's original frame presentation timing.

12. The method according to claim 11, wherein the steps (a) and (c) further comprising the following steps:

using a custom-built GUI for creating a video rights edit decision list (EDL) of restricted frames, useable during a video file editing session for preventing unauthorized use of restricted video frames; and using the video rights EDL for inserting or updating the video rights metadata flags of the affected video frame of the MPEG video file.

13. The method according to claim 11, wherein the updating steps (c) and (d) further comprising the step of locating the timecode packet of the affected video frame of the MPEG video file randomly by binary search, using the video frame's nearest GOP header byte offset obtained through a GOP offset table lookup.

14. The method according to claim 11, wherein the video rights metadata being selected from a group comprising full rights, limited rights, no rights, or expired rights.

15. The method according to claim 11, wherein the timecode packet being inserted in a user data packet of the video frame, between a picture start header and a first slice header.

* * * * *